US007611075B2

(12) United States Patent
Relyea et al.

(10) Patent No.: US 7,611,075 B2
(45) Date of Patent: Nov. 3, 2009

(54) EXTENSIBLE AERIAL BOOM HAVING TWO INDEPENDENTLY OPERATED FLUID NOZZLES

(76) Inventors: Robert G. Relyea, 6526 Southpoint Dr., Dallas, TX (US) 75248; Grady C. North, 929 Yellowstone, Dallas, TX (US) 76051

( * ) Notice: Subject to any disclaimer, the term of this patent is extended or adjusted under 35 U.S.C. 154(b) by 486 days.

(21) Appl. No.: 11/200,897

(22) Filed: Aug. 10, 2005

(65) Prior Publication Data

US 2007/0034389 A1 Feb. 15, 2007

(51) Int. Cl.
*A01G 25/09* (2006.01)
*A62C 27/00* (2006.01)

(52) U.S. Cl. ....................... 239/172; 239/165; 239/272; 169/24; 169/70

(58) Field of Classification Search ................... 169/24, 169/25, 43, 45, 47, 62, 70; 239/159, 162, 239/172, 271, 272, 548, 73, 164, 165, 166
See application file for complete search history.

(56) References Cited

U.S. PATENT DOCUMENTS 3,599,722 A * 8/1971 Davidson et al. .............. 169/24
3,604,627 A * 9/1971 Miscovich et al. .......... 239/166
5,211,245 A * 5/1993 Relyea et al. ................. 169/24
5,301,756 A 4/1994 Relyea et al.
5,438,261 A * 8/1995 Codina et al. .......... 324/207.16
5,788,158 A 8/1998 Relyea
5,839,664 A 11/1998 Relyea
6,126,088 A * 10/2000 Wilger et al. ............... 239/170
6,755,259 B2 * 6/2004 Peltola et al. ................. 169/47

* cited by examiner

*Primary Examiner*—Davis Hwu
(74) *Attorney, Agent, or Firm*—Porter, Wright, Morris & Arthur, LLP.

(57) ABSTRACT

A novel aerial boom system for use atop a vehicle and having linear movement sensors associated with hydraulic cylinders for moving lower and upper booms such that a microprocessor associated with the system can determine the instantaneous position of each boom and coordinate movement of the booms with respect to each other and with the vehicle to prevent undesired contact and to gradually decelerate boom movement as the boom approaches its limits to avoid shock from sudden stop of boom movement. When the novel system is used with a fire fighting vehicle, two variably spaced, independently controllable, fluid discharge nozzles can be used to fight one or two separate and distinct fires simultaneously. A piercing nozzle can be associated with the outer end of the upper boom that is independently controllable in both the vertical plane and in the horizontal direction to enable piercing of a wall independent of boom movement to assist penetration.

16 Claims, 3 Drawing Sheets

EXTENSIBLE AERIAL BOOM HAVING TWO INDEPENDENTLY OPERATED FLUID NOZZLES

FIELD OF THE INVENTION

The present invention relates in general to extensible aerial booms for fire fighting equipment and, in particular, to an extensible aerial boom that has two independently articulated and independently operated fluid flow nozzles each with a different fluid flow thereby enabling two localized, but separate, fires to be fought simultaneously.

BACKGROUND OF THE INVENTION

In the prior art, an elongated, extensible, boom has a fluid dispersing nozzle on the outer end thereof along with a piercing nozzle. Either nozzle can be used but they are used separately and almost never used together. Their use is directed to confront a single fire. Inasmuch as fires may erupt or break out at any moment in different adjacent or nearby spots or areas, it is impossible for the systems of the prior art to confront or fight two fires in different nearby areas simultaneously.

In U.S. Pat. No. 5,839,664, a piercing nozzle moves in a vertical plane only with respect to the longitudinal axis of the extensible boom. The fluid nozzle can be moved to a position 90° displaced from, or perpendicular to, the piercing nozzle to allow more space for the piercing nozzle to penetrate a necessary wall without damaging the fluid nozzle. Only one of the fluid nozzles can be used at any one time.

Further, extensible aerial booms are well known in the art as shown in U.S. Pat. No.'s 5,788,158 and 5,301,756. Each of these patents discloses a piercing nozzle at the end of an elongated boom. When used to pierce a wall such as the skin of an airplane, the longitudinal axis of the piercing nozzle must either be in longitudinal alignment with, or perpendicular to, the longitudinal axis of the boom. If these requirements were not so and the longitudinal axis of the piercing nozzle was out of alignment with the longitudinal axis of the boom, as the boom moves forward to cause the piercing nozzle to pierce the wall, a stress moment arm is placed upon the piercing nozzle and may snap if off of its mountings or otherwise damage it. This possibility of damage is shown in FIG. 14 of U.S. Pat. No. 5,301,756 and is discussed in column 10 therein. The same analysis applies to the longitudinal axis of the piercing nozzle not being perpendicular to the longitudinal axis of the boom. As the boom moves downwardly in an arc as shown in FIG. 12 in the '756 patent to force the piercing nozzle through the wall (or skin of an aircraft), the piercing nozzle can be damaged if its longitudinal axis is NOT perpendicular to the boom longitudinal axis. In order to minimize such possibility of damage, a slip-clutch is placed between the piercing nozzle and its boom attachment point.

Further, in the prior art, extensible booms move outwardly and inwardly at high speeds. To prevent damage to either the stable portion of the boom, the extensible portion, or the vehicle, sensors are placed on or associated with the extensible boom to detect its nearness to its limits. The sensor signals are then fed to a computer which tells the boom to immediately stop. Such sudden stops place a great deal of stress on the fluid discharge nozzles and other components by the sudden change of speed of the extensible boom.

In the U.S. Pat. No. 5,301,756 patent, the fluid nozzle and the piercing nozzle move together in both the vertical plane and horizontal plane but, again, only one nozzle can be utilized to dispense fluid at any one time. There is no possibility of individually controlling two nozzles to allow two adjacent or nearby fires to be attacked or fought simultaneously.

Finally, in U.S. Pat. No. 5,301,756, the outer boom is moved in the vertical plane by first and second link sections slidable within each other. The bottom end of the lower link is connected to the boom turntable while the outer end of the upper link is connected to the inner end of the upper boom. A hydraulic piston is coupled between the two slidable links to move the links with respect to each other to raise or lower the upper boom. This system completes its task well but corrosion internal of the slidable sections causes added stress to be placed on the links and requires difficult maintenance.

It would be advantageous to have an extensible upper aerial boom for pivotal mounting on the outer end of a lower boom that is attached at its inner end to a vehicle, the extensible upper aerial boom having at least two independently controlled fluid discharge nozzles to allow fires in two adjacent areas to be fought simultaneously; that had a hydraulically driven piercing nozzle to allow penetration of a wall without requiring the boom itself to provide the penetrating force; that had the extensible upper boom with a fixed portion and a moveable portion; and that had linear sensors associated with the hydraulic cylinders that move the lower and upper booms in a vertical plane

SUMMARY OF THE INVENTION

The present invention provides an improved upper extensible boom for a fire fighting vehicle, the extensible boom having a stationary portion and an extensible portion with a first low volume fluid discharge nozzle and a piercing nozzle mounted on the outer end of the extensible portion and a second high volume fluid discharge nozzle associated with the outer end of the stationary portion. Each of the fluid discharge nozzles is independently controlled so that two different fires, occurring in two adjacent or nearby areas, can be separately addressed and fought simultaneously.

The piercing nozzle on the outer end of the upper extensible boom is individually controllable with respect to the low volume fluid discharge nozzle for movement only in the vertical plane. It also has a power source, preferably a hydraulic system, for selectively forcing the piercing nozzle through a wall structure such as the outer skin of an aircraft so that, when the tip of the nozzle touches the wall or skin of an aircraft, at any angle to the longitudinal axis of the extensible boom, the hydraulic system can force the piercing nozzle through the wall without damage to the piercing nozzle.

Inasmuch as the upper extensible boom is pivotally mounted at its inner end to the outer end of the lower boom and the lower boom is pivotally mounted at its inner end to the vehicle, a first hydraulic cylinder is placed between the vehicle and the outer end of the lower boom to raise and lower the lower boom in the vertical plane. A second hydraulic cylinder is coupled between the vehicle and the inner end of the upper boom to raise and lower the upper boom in the vertical plane with respect to any vertical position of the lower boom. The second hydraulic cylinder is substituted for the sliding links in the prior art system and eliminates corrosion problems with the links.

Further, a linear position sensor is associated with each of the first and second hydraulic cylinders that move the upper extensible boom and the lower boom and they develop electrical position signals for each cylinder. These signals are coupled to a microprocessor and are used to coordinate boom movements. With the linear sensors, the microprocessor determines when a hydraulic cylinder is nearing its movement limits and can command a smooth stop of the hydraulic cylinder without adding additional unnecessary stress on the booms and their components.

Also, the electrical signals generated by the linear sensors enable the microprocessor to be programmed to override an operator command that could cause a serious problem. For example only, if the lower boom is in its uppermost position and the operator uses a control device to manually command the upper boom, in its non-extended position, to move downwardly to a point where the upper boom would strike the vehicle, the microprocessor, because of the linear position sensors, would compute the point in downward movement when the upper boom would strike the vehicle and would intervene to prevent further movement of the upper boom although a manual "down" command is being issued.

Thus, it is an object of the present invention to provide an aerial boom that has at least two independently controllable fluid discharge nozzles thereon to allow two separate and distinct fires in adjacent or nearby areas to be fought simultaneously.

It is an important object of the present invention to provide an extensible aerial boom with a fixed portion and a moveable portion and both an independently controllable low volume fluid discharge nozzle and a piercing nozzle on the outer end of the extensible portion of the aerial boom. An independently controllable second fluid discharge nozzle, a high volume nozzle, is associated with the outer end of the stationary portion of the aerial boom to enable two separate and distinct fires in adjacent or nearby areas to be fought simultaneously. Thus, the low volume fluid discharge nozzle on the outer end of the extensible portion of the boom can be individually controlled to fight one fire in one location while the high volume fluid discharge nozzle associated with the outer end of the fixed portion of the aerial boom can be individually controlled to fight a second fire in a second adjacent or nearby area within reach of the high volume fluid.

It is another important object of the present invention to provide a piercing nozzle on the outer end of the extensible aerial boom that is independently power driven to force the piercing nozzle through a wall such as an airplane surface skin to inject fire extinguishing fluid on the other side of the wall that has been pierced. The preferred embodiment of the independently driven power source includes a hydraulic power source to force the piercing nozzle through the wall.

It is yet another important object of the present invention to provide power sources such as hydraulic cylinders to provide the boom lifting power for both the upper boom and the lower boom as well as for extending the extensible portion of the upper boom, with each hydraulic cylinder having associated therewith a linear sensor that generates electrical signals representing movement of both the upper and lower booms in the vertical plane as well as longitudinal movement of the extensible portion of the upper boom.

It still another important object of the present invention to provide a microprocessor for receiving the electrical signals from the linear sensors and calculating the position of the upper and lower booms with respect to each other and with respect to the vehicle and to cause deceleration of the boom movement gradually as it approaches a vertical plane limit as well as a gradual deceleration of longitudinal movement of the extensible portion of the upper boom as it approaches its outward and inward limits thereby reducing shock to the system caused by sudden stopping of the massive booms.

Thus, the invention relates to an aerial boom having an outer end and an inner end for mounting atop a fire fighting vehicle comprising a first individually controllable fluid discharge nozzle located proximate the outer end of the aerial boom for fighting a fist fire and a second individually controllable fluid discharge nozzle associated with the aerial boom and spaced a predetermined distance from the outer end of the boom thereby enabling two separate spaced fires to be fought simultaneously.

The invention also relates to an aerial boom mounted atop a fire fighting vehicle comprising an outer end of the aerial boom; a piercing nozzle associated with the outer end of the aerial boom; and a power system, preferably hydraulic, coupled to the piercing nozzle for enabling independent movement of the piercing nozzle with respect to the boom in the longitudinal direction of the nozzle to enable the piercing nozzle to penetrate a wall such as that forming an aircraft inner compartment to inject fire fighting fluid into the compartment.

The invention further relates to the use of linear sensors associated with power sources, preferably hydraulic power sources, for generating electrical signals that represent the position of the lower and upper booms in the vertical plane as well as the movement of the extensible boom longitudinally to enable gradual deceleration of the upper and lower boom movement in the vertical plane and also enable gradual deceleration of any of the booms as they approach predetermined limits of movement thereby avoiding unnecessary shock to the boom system by sudden stops.

BRIEF DESCRIPTION OF THE DRAWINGS

These and other more detailed objects of the present invention will be more fully disclosed when taken in conjunction with the following DETAILED DESCRIPTION OF THE DRAWINGS in which like elements are represented by like numerals and, in which.

DETAILED DESCRIPTION OF THE PREFERRED EMBODIMENT

Figure 1:
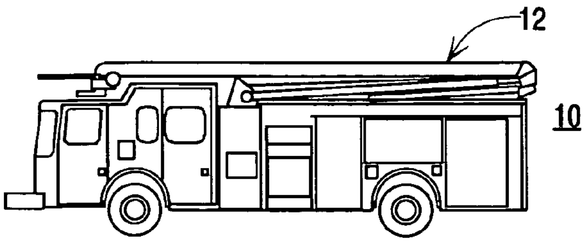
FIG. 1 is a side view of a fire fighting truck with the novel boom cradled or at rest.

FIG. 1 is a side view of a fire fighting vehicle 10 illustrating the novel boom system 12 in its cradled or nested position for travel.

Figure 2:
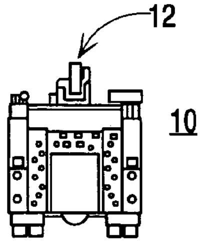
FIG. 2 is an end view of the fire fighting truck of FIG. 1 with the novel boom in the cradled or rest position.

FIG. 2 is a rear-end view of the fire fighting vehicle 10 of FIG. 1 illustrating the novel boom system 12 in its cradled or nested position for travel.

Figure 3:
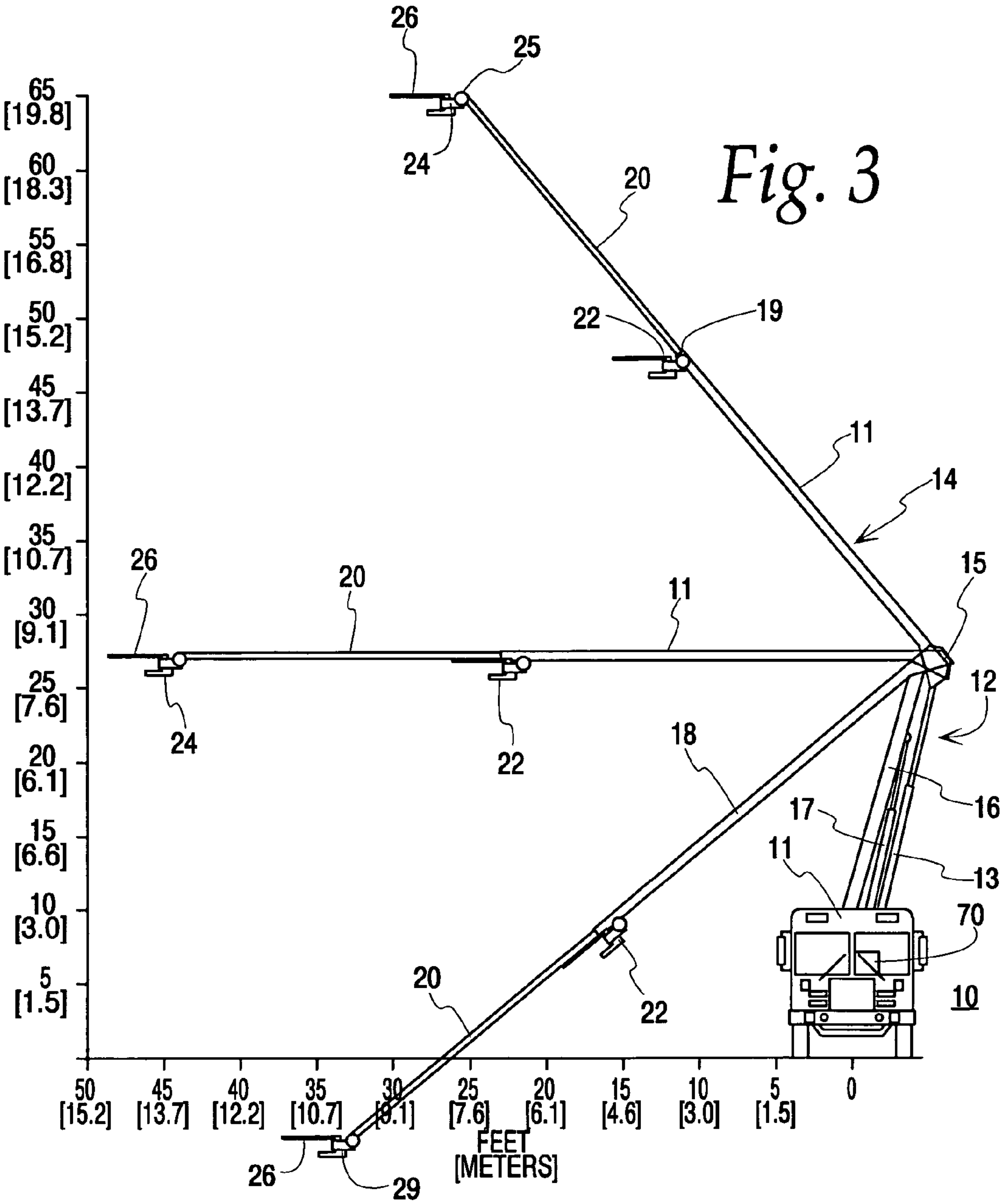
FIG. 3 is a front view of the fire fighting truck of FIG. 1 with the novel boom shown in its most elevated position, its medium level position, and its lowest level position.

FIG. 3 is a front-end view of the fire fighting vehicle 10 of FIG. 1 and FIG. 2 illustrating the novel boom system 12 with an upper extensible boom 14 and a lower, fixed length, boom 16 and showing both the upper extensible boom 14 in its uppermost extensible position, a medium height extensible position, and its lowermost extensible position and the lower fixed length boom 16 is its uppermost position. It will be noted that the lower, fixed length, boom 16 is raised and lowered in the vertical plane by a hydraulic cylinder 17. It will also be noted that the inner end 15 of the upper extensible boom 14 is directly connected to one end of hydraulic cylinder 13 and the opposite end of the hydraulic cylinder 13 is directly connected to the fire fighting vehicle 10. This connection eliminates the prior art sliding connections between the fire fighting vehicle 10 and the inner end 15 of the upper extensible boom 14. The sliding connections of the prior art enable corrosion and wear to bind the slidable connections and cause the need for more power to move them.

Thus, the novel aerial boom system 12 comprises a lower boom 16 having an outer end and an inner end 11 pivotally coupled to the fire fighting vehicle 12. The upper boom 14 has a longitudinally extensible portion 20 with an outer end 25 and a fixed length stationary portion 18 with an inner end pivotally coupled to the outer end of the lower boom 16 at pivot point 15 and an outer end 19. At or proximate the outer end 19 of the fixed portion 18 of upper boom 14 is a first fluid flow nozzle 22. It is independently controllable in pointing direction and in fluid flow and is a high volume (1000 GPM) nozzle. At or proximate the outer end 25 of the extensible boom portion 20 is a second fluid flow nozzle 24. It is also independently controllable in pointing direction and in fluid flow and is a low volume (500 GPM) nozzle. A relatively large area is covered as both of the nozzles are independently controllable in direction and in horizontal spacing (extension or retraction of the extensible portion 20 of the upper boom), and it will be understood that two separate fires in adjacent or near areas can be fought simultaneously. The first fluid flow nozzle 22 can be independently directed at a first fire while the second fluid flow nozzle 24 can be independently controlled or directed at a second fire spaced from the first fire but in reach of the fluid discharged from the second nozzle 24.

As stated, a relatively wide area can be covered or reached by the novel boom fluid nozzles because the extensible portion 20 of upper boom 14, and its outer portion 25 having the low volume fluid flow nozzle 24 can be moved inwardly toward the outer end 19, and high volume nozzle 22, of the stationary portion 18 of the upper boom 14. Inasmuch as the inner end 11 of the lower boom 16 is rotatably secured to the fire fighting vehicle 10, the upper and lower booms 14 and 16 can move in a circular manner as well as in a retractable or extensible manner and therefore cover a wide area for fighting two adjacent but separate fires that are reachable by the fluid flow from the first and second fluid nozzles 22 and 24. This is an important feature of the present invention that enables a second fire to be extinguished by fluid from one nozzle while simultaneously a first fire is being fought with the fluid from the other nozzle.

Thus a first individually controllable fluid discharge nozzle 24 is located at the outer end 25 of the aerial boom 14 for fighting a first fire and a second individually controllable fluid discharge nozzle 22 associated with the aerial boom 14 and spaced at a predetermined distance from the outer end of the aerial boom 14 (by the position of the extensible boom portion 20) for alternatively fighting either one of the first fire and a second different fire in the immediate area. The first individually controllable fluid discharge nozzle is a low fluid volume nozzle (500 GPM) and the second individually controllable fluid discharge nozzle is a high fluid volume nozzle (1000 GPM).

It will be noted in FIG. 3, that the extensible boom can reach as high as 65 feet and as low as between 5 and 10 feet below the horizontal. This allows a wide range of fire fighting capability with the use of the novel boom system.

It can also be seen in FIG. 3 that a piercing nozzle 26 is located at the outer end 25 of the extensible portion 20 of the upper boom 14. The piercing nozzle 26 is independently operated in the vertical and horizontal planes. The automatic leveling system can be disabled and the piercing nozzle independently moved in the vertical plane. It is well known that if the piercing nozzle must be forced through a wall by moving the upper boom forward, the piercing nozzle must be in exact horizontal alignment with the boom to prevent moment arm forces being applied to the piercing nozzle and damaging it.

Figure 4:
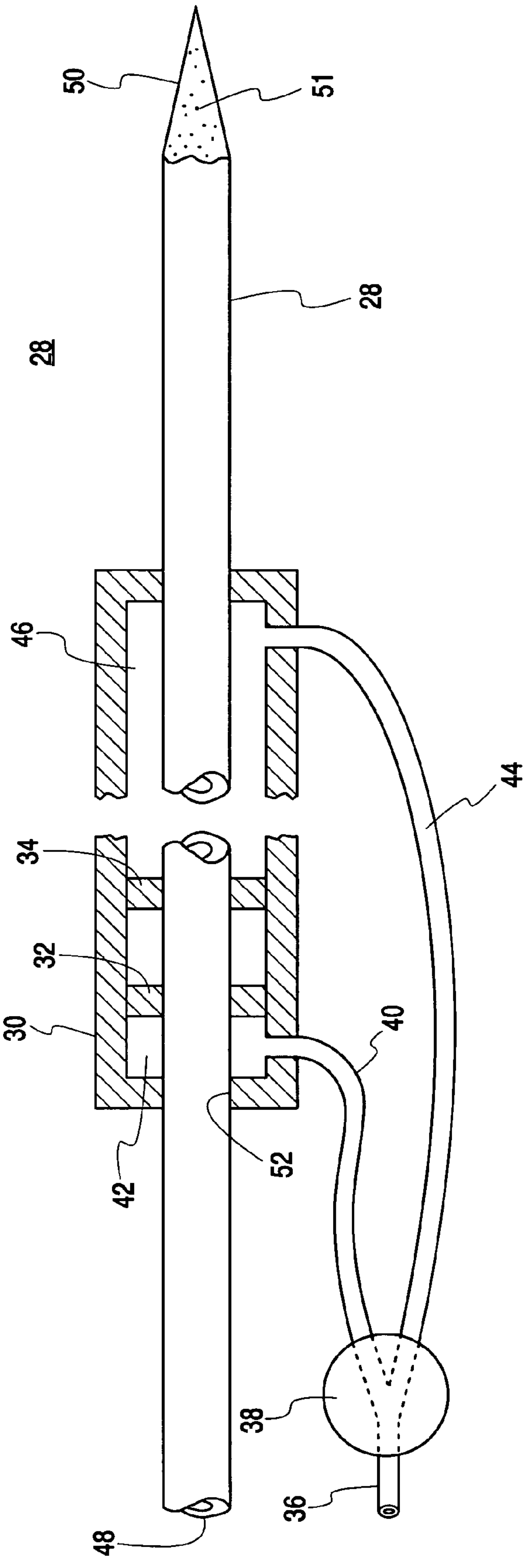
FIG. 4 is a schematic view of a hydraulic system for independently moving a piercing nozzle with respect to the outer end of an aerial boom.

FIG. 4 is schematic representation of a novel power system, shown as a hydraulic power system in this case, that can enable independent movement of the piercing nozzle, with respect to the upper boom, along its longitudinal axis to enable the piercing nozzle to penetrate a wall such as those forming at least one inner compartment in an aircraft to inject fire fighting fluid into the compartment.

The power system 28 shown in FIG. 4 includes a piercing nozzle 26 that is attached to the outer end 25 of the extensible portion 20 of the upper boom 14 in a well known manner. It is also shown to be a hydraulic power system but could be any other type of power system such as an electrically operated system.

As shown in FIG. 4, the piercing nozzle 26 has a hollow interior 48 and a piercing end 50 with a plurality of orifices 51 that enable a fluid in the hollow interior 48 to be dispersed from the piercing end 50. The entire piercing nozzle 26 is mounted in a housing 30, shown in cross-section in FIG. 4, that is attached to the outer end 25 of the extensible portion 20 of the upper boom 14. The housing 30 acts as a hydraulic cylinder in this case and when hydraulic fluid in lines 36 is directed by controllable valve 38 to fluid line 40, the fluid enters chamber 42 and applies pressure to surface 32. Surface 32 is rigidly attached to piercing nozzle 26 and causes the nozzle to move to the right in FIG. 4. If the tip, or piercing end 50, of piercing nozzle 26 is against a wall such as an aircraft outer skin, the hydraulic pressure in chamber 42 drives, or forces, the piercing nozzle through the wall into the interior compartment of the aircraft. No movement of the boom is required whatsoever.

When it is desired to retract the piercing nozzle from the wall, the valve 38 is positioned such that the hydraulic fluid in line 36 is directed to line 44 and into the interior of chamber 46. The pressure against surface 32 moves the surface 32 to the left in FIG. 4. Since the surface 32 is rigidly attached to piercing nozzle 26, the piercing nozzle is forced to the left in FIG. 4 and is withdrawn from the wall that it has pierced. Any type of pressure seals, well known in the art, such as O-rings 52 can be used to seal the hydraulic chambers 42 and 46 during movement of the piercing nozzle 26. As stated above, the hydraulic system 28 shown in FIG. 4 is for explanatory purposes only and could be any type of power system desired.

Figure 5:
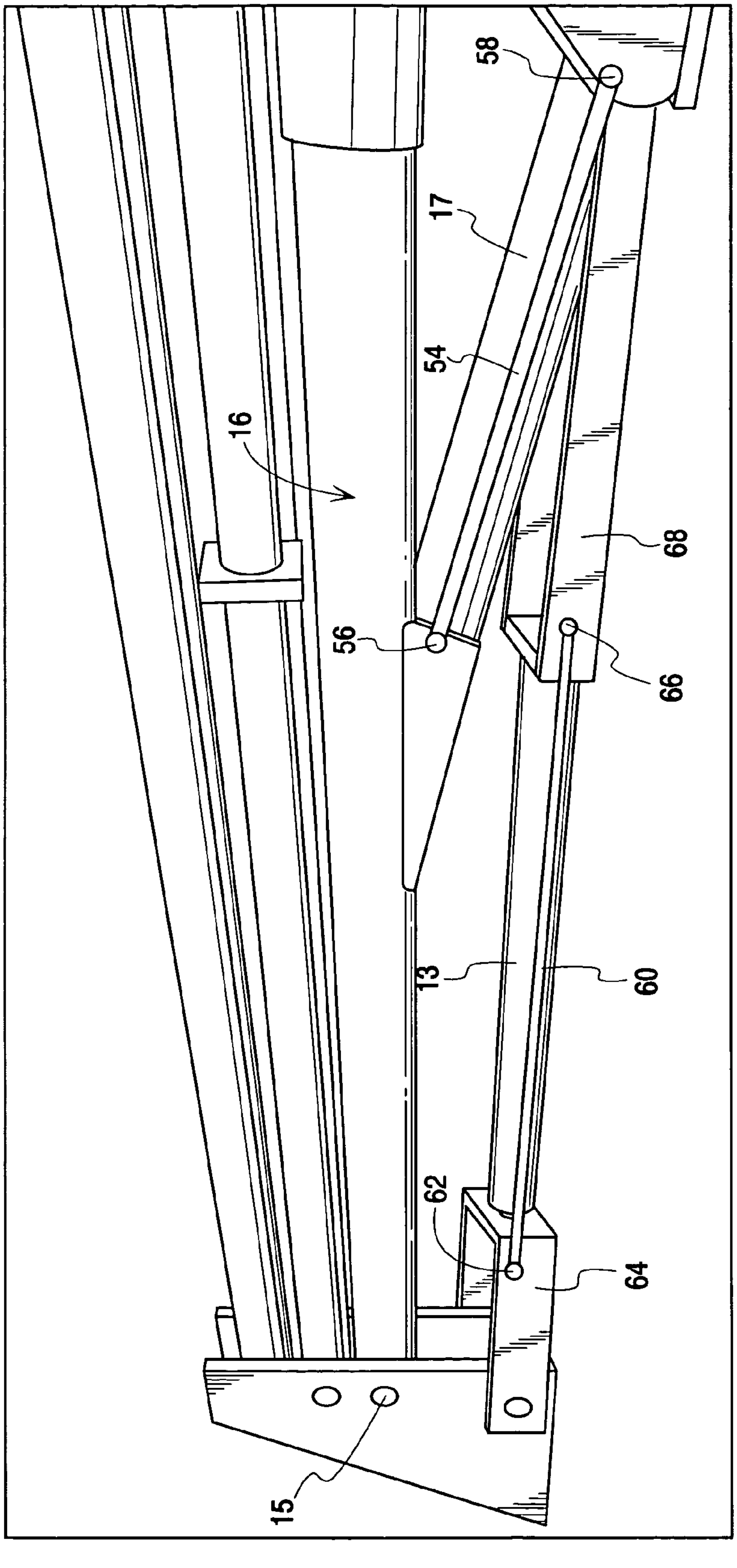
FIG. 5 is a schematic view of a linear sensor associated with a boom operated hydraulic cylinder to accurately measure the distance of boom travel, generate electrical signals representative of that travel, and transfer the signals to a microprocessor to control movement of the booms.

FIG. 5 illustrates the connection of the linear sensors to generate electrical signals representing the movement of the hydraulic pistons or the position of each of the booms. In FIG. 5, hydraulic cylinder 17 moves lower boom 16 in a vertical plane as shown in FIG. 3. A linear sensor 54 is attached at one end 56 to the lower boom 16 and at the other end 58 to the fire fighting vehicle. As the hydraulic cylinder 17 moves to raise the lower boom 16, the linear sensor 54 generates electrical signals in a well known manner that represent the instantaneous position or movement of the lower boom 16.

In like manner, hydraulic cylinder 13 is connected at one end to the arms 64 that connect to the outer end or pivot point 15 (See FIG. 3) to move the upper boom 14 in a vertical plane. The inner or lower end of the hydraulic cylinder 13 is connected to the arms 68 that are attached to the fire fighting vehicle at 11 as shown in FIG. 3. A linear sensor 60 is attached at one end 62 to the arms 64 that connect to the outer end or pivot 15 of the upper boom 14. The other end 66 of the linear sensor 60 is connected to the arms 68 that are attached to the fire fighting vehicle.

As is well known in the art, as the hydraulic cylinders are commanded to move by instructions from a microprocessor 70 (illustrated as a block in the cab of the fire fighting vehicle shown in FIG. 3), the linear sensors 13 generate electrical signals in a well known manner that are coupled to the microprocessor 70 and the instantaneous positions of the upper and lower booms with respect to each other and with respect to the fire fighting vehicle are calculated by the microprocessor 70. Signals are then generated by the microprocessor 70 that cause the booms to gradually decelerate as they approach travel limits. Such operation of a microprocessor 70 is old and well known in the art and will not be further discussed here. The use of linear sensors, instead of point sensors, is very important to this invention as the point sensors generate warning signals only when the booms near their limitation of movement. Such generated signals cause a sudden deceleration of boom movement that causes shock and stress on the boom components. With the use of linear sensors, the microprocessor 70 knows at all times where the booms are located and can generate deceleration signals that gradually bring the booms to a stop rather than creating an abrupt stop.

While the use of the linear sensors has been discussed in relation to a fire fighting vehicle, it can be seen that the use of the linear sensors with any type of boom on any type of vehicle would be advantageous.

Thus, there has been described a novel aerial boom system having several novel advantages when used with a fire fighting vehicle.

First, the boom system has first and second fluid discharge nozzles that are independently controllable to enable two spaced separate fires in a common area to be fought simultaneously. A first one of the nozzles, a low fluid volume nozzle (500 GPM) is mounted proximate the outer end of an extensible portion of an upper boom while the second nozzle, a high fluid volume nozzle (1000 GPM) is mounted proximate the outer end of the stationary portion of the upper boom. Since the extensible portion of the upper boom is moveable with respect to the stationary portion, the distance between the first and second nozzles is adjustable. Since the upper boom can also be rotated with respect to the vehicle, the distance between the nozzles is adjustable, and each of the nozzles is independently adjustable in direction and fluid flow, two separate and distinct fires in a large area may fought simultaneously and effectively.

Second, the novel system incorporates a piercing nozzle that is moved longitudinally and vertically independently of the boom movement. This means that the piercing nozzle may be placed against a surface and moved longitudinally by its own power (in any vertical plane position) to penetrate the surface and inject the fire fighting fluid behind the surface. No movement of the boom (on which the piercing nozzle is located) is required to cause penetration of the surface as in the prior art.

Third, the novel system utilizes linear position sensors to generate electrical signals representing boom movement and position. These signals are coupled to a microprocessor in the cab of the vehicle. The signals are used by the microprocessor to calculate the position of the booms and coordinate boom movement with respect to each other and to the vehicle to prevent any collisions. Also, because the signals represent the position of the booms, the microprocessor knows when the booms are approaching a movement limit and can generate signals that gradually decelerate the boom movement and prevent shock to system components that can be caused by sudden stops.

Fourth, the novel system has a first hydraulic cylinder with a first end connected directly to the vehicle and a second end connected to the lower boom to move the lower boom in a vertical plane and a second hydraulic cylinder having a first end connected to the vehicle and a second end connected to the inner end of the upper boom to move the upper boom in a vertical plane. By directly connecting the second hydraulic cylinder between the outer end of the upper boom and the vehicle, there are no slidable elements as used in the prior art that can become corroded, warped, or otherwise create difficulty in movement of the upper boom.

The above features, taken either alone or in combination, are to the best of applicant's knowledge not found in the prior art and are therefore novel.

The corresponding structures, materials, acts, and equivalents of all means or step plus function elements in the claims below are intended to include any structures, materials, or acts for performing the function in combination with other claimed elements as specifically claimed.

The invention claimed is:

1. An extensible aerial boom for a liquid discharging vehicle comprising:

a lower boom having an outer end and an inner end, the inner end being pivotally connected to the vehicle for movement in a vertical plane;

an upper boom having an extensible portion and a stationary portion;

an inner end on the stationary portion of the upper boom being pivotally connected to the outer end of the lower boom for enabling movement of the upper boom in the vertical plane;

an outer end on the stationary portion of the upper boom;

an outer end on the extensible portion of the upper boom that is moveable longitudinally with respect to the outer end of the stationary portion of the upper boom;

a first fluid discharge nozzle, independently controlled in position and in fluid flow, associated with the outer end of the stationary portion of the upper boom discharging a first fluid for fighting a first fire;

a second fluid discharge nozzle in a different plane from a plane of the first nozzle, independently controlled in position and fluid flow, associated with the outer end of the extensible boom discharging a second fluid for fighting a second fire; thereby enabling simultaneous discharge of fluid to two separate locations in a given area and wherein the fluid flow of the nozzles may be different and wherein the positions may be such that the nozzles each discharge fluid in the same direction; and wherein the spacing between the first individually controllable fluid discharge nozzle and the second individually controllable fluid discharge nozzle is varied by varying the amount of extension of the extensible portion of the upper boom.

2. The aerial boom of claim 1 wherein:

the first individually controllable fluid discharge nozzle is a low fluid volume nozzle; and the second individually controllable fluid discharge nozzle is a high fluid volume nozzle.

3. The aerial boom of claim 1 wherein the first individually controllable fluid discharge nozzle is a high fluid volume discharge nozzle.

4. The aerial boom of claim 3 wherein the second individually controllable fluid discharge nozzle is a low fluid volume discharge nozzle.

5. An aerial boom as in claim 1 wherein at least one of the first individually controllable fluid discharge nozzle and the second individually controllable fluid discharge nozzle is a piercing nozzle.

6. An aerial boom as in claim 5 further comprising:

a system coupled to the piercing nozzle for enabling independent movement of the piercing nozzle longitudinally in a range of vertical plane positions without regard to the boom position to enable the piercing nozzle to penetrate the wall.

7. An aerial boom as in claim 1 further comprising:

a first cylinder having a first end connected to the vehicle and a second end connected to the lower boom to move the lower boom in the vertical plane; and a second cylinder independent of the first cylinder having a first end connected to the vehicle and a second end connected to the pivotal inner end of the stationary portion of the upper boom to move the upper boom, including the outer end, in a vertical plane.

8. The aerial boom of claim 7 further comprising:

a first linear sensor having first and second ends respectively coupled to the corresponding first and second ends of the first hydraulic cylinder for generating electrical signals that determine the distance of travel of the first cylinder, a second linear sensor having first and second ends respectively coupled to the corresponding first and second ends of the second cylinder for generating electrical signals that determine the distance of travel of the second cylinder; and a microprocessor electrically coupled to the first and second linear sensors for receiving the electrical signals generated by the first and second linear sensors and calculating the instantaneous positions of the upper and lower booms with respect to each other and with respect to the vehicle and to allow gradual deceleration of not only the vertical movement of the booms but also the gradual deceleration of the booms as they near predetermined limits of movement.

9. An aerial boom as in claim 1 further comprising: a first linear sensor associated with movement of the lower boom for generating electrical signals that represent the distance of travel of the lower boom in the vertical plane;

a second linear sensor associated with movement of the upper boom for generating electrical signals the represent the distance of travel of the upper boom in the vertical plane; and a microprocessor electrically coupled to the first and second linear sensors for receiving the electrical signals from the first and second linear sensors and calculating the positions of the upper and lower booms with respect to each other and with respect to the vehicle to allow gradual deceleration of not only the vertical movement of both the upper and lower booms but also the gradual deceleration of each of the booms as they near predetermined limits of movement.

10. The aerial boom of claim 9 further comprising:

the extensible portion of the upper boom extending longitudinally with respect to the first stationary portion;

a first cylinder having a first end connected to the vehicle and a second end connected to the outer end of the lower boom to move the lower boom in the vertical plane;

a second cylinder independent of the first cylinder having a first end connected to the vehicle and a second end connected to the inner end of the stationary portion of the upper boom to move the upper boom, including the outer end, in a vertical plane; and the first and second linear sensors being associated with respective ones of the first and second cylinders for determining cylinder movement and generating the corresponding electrical signals.

11. A method of fighting two fires simultaneously with an aerial boom as in claim 1.

12. The method of claim 11 further comprising the steps of:

using a low volume fluid flow nozzle as the first fluid discharge nozzle; and using a high volume fluid flow nozzle as the second fluid discharge nozzle.

13. The boom for a liquid discharging vehicle of claim 1 further comprising an elongated surface piercing nozzle located proximate the outer end of the extensible portion of the upper boom with second individually controllable fluid discharge nozzle the wherein movement of the piercing nozzle is controlled independently with respect to the upper boom in the vertical plane such that the piercing nozzle moves in its longitudinal direction to pierce a surface independent of boom movement.

14. The boom for a liquid discharging vehicle of claim 13 further comprising power source coupled to the piercing nozzle to independently cause the piercing nozzle to move in its longitudinal direction and pierce a surface.

15. A method of fighting fires in an inner compartment formed by a wall with an aerial boom as in claim 1 comprising the steps of:

locating a piercing nozzle on the outer end of an aerial boom;

independently moving the piercing nozzle in the vertical plane; and independently moving the piercing nozzle along its longitudinal axis without respect to the boom position to enable the piercing nozzle to penetrate the wall and inject fire fighting fluid into the inner compartment.

16. A method of controlling the positions of at least the upper and lower booms of the aerial boom as in claim 1 comprising the steps of:

moving the upper and lower booms in a vertical plane with first and second cylinders, each cylinder having a first end connected to the vehicle and a second end connected to its respective boom and independent of each other; a linear sensor associated with and connected between each end of each cylinder for generating electrical signals representing continuous boom position of the respective booms; and a microprocessor coupled to each linear sensor for receiving the generate electrical signals and controlling the respective positions of the booms relative to each other and to the vehicle to prevent undesirable contact and to enable gradual deceleration of not only the vertical movement of the booms but also the gradual deceleration of the booms as they near predetermined limits of movement.

* * * * *